US008694056B2

(12) United States Patent
 Carmon et al.

(10) Patent No.: US 8,694,056 B2
(45) Date of Patent: Apr. 8, 2014

(54) SCALABLE DIGITAL BASE BAND PROCESSOR FOR CELLULAR BASE STATIONS

(75) Inventors: Rafy Carmon, Rishon le Zion (IL); Amir Appel, Kfar Saba (IL)

(73) Assignee: Percello Ltd., Raanana (IL)

( * ) Notice: Subject to any disclaimer, the term of this patent is extended or adjusted under 35 U.S.C. 154(b) by 1101 days.

(21) Appl. No.: 12/263,492

(22) Filed: Nov. 2, 2008

(65) Prior Publication Data

US 2010/0113095 A1    May 6, 2010

(51) Int. Cl.
  *H04M 1/00*    (2006.01)
  *H04B 1/38*    (2006.01)
(52) U.S. Cl.
  USPC ......................................................... 455/561
(58) Field of Classification Search
  USPC ......................................................... 455/561
  See application file for complete search history.

(56) References Cited

U.S. PATENT DOCUMENTS

| 6,359,901 | B1 * | 3/2002 | Todd et al. | 370/465 |
| 2003/0021367 | A1 * | 1/2003 | Smith | 375/346 |
| 2004/0185907 | A1 * | 9/2004 | Lange | 455/561 |
| 2005/0064892 | A1 * | 3/2005 | Cavin | 455/550.1 |
| 2007/0177552 | A1 * | 8/2007 | Wu et al. | 370/335 |
| 2008/0212658 | A1 * | 9/2008 | Rofougaran | 375/219 |

FOREIGN PATENT DOCUMENTS

| EP | 1 450 572 A1 | 8/2004 |
| EP | 1 713 290 A1 | 10/2006 |
| WO | WO 00/13442 A1 | 3/2000 |
| WO | WO 2010/061369 A1 | 6/2010 |

OTHER PUBLICATIONS

International Search Report and Written Opinion directed toward related International Application No. PCT/IL2009/000983 mailed Mar. 23, 2010, European Patent Office, Rijswijk, The Netherlands; 10 pages.
International Preliminary Report on Patentability directed toward related International Application No. PCT/IL2009/000983 mailed May 3, 2011, Geneva, Switzerland; 7 pages.

* cited by examiner

*Primary Examiner* — Yuwen Pan
*Assistant Examiner* — Ayodeji Ayotunde
(74) *Attorney, Agent, or Firm* — Sterne, Kessler, Goldstein & Fox P.L.L.C.

(57) ABSTRACT

An array of base band processors cooperating for sharing processing power in managing and controlling user equipment traffic in a small cellular communication base station (Femtocell). The base band processors array comprises: a master base band processor; and a plurality of slave base band processors, wherein each base band processor comprise a processing unit, a first layer engine, and communication, control and interface modules providing scalability support functionality, and wherein the processing unit and the first layer engine are arranged in cooperation to manage and control user equipment traffic in the cellular communication base station, and wherein the scalability support functionality is arranged to enable coherent and aligned cooperation between the master base band processor and the plurality of slave base band processors connected thereto. Advantageously the array of base band processors may achieve tight control over base station power consumption, increased range and adjustable number of supported users.

21 Claims, 6 Drawing Sheets

SCALABLE DIGITAL BASE BAND PROCESSOR FOR CELLULAR BASE STATIONS

TECHNICAL FIELD

The present invention relates to the field of cellular communication networks, and more particularly, to digital base band processors implemented within base stations of such networks.

BACKGROUND OF THE RELATED ART

Prior to setting forth the background of the related art, it may be helpful to set forth definitions of certain terms that will be used hereinafter.

The term "cellular communication network" as used herein in this application, is defined as any radio frequency (RF) based communication network that is based upon geographical partition of space into cells. Each cell is provided with at least one base station that manages the wireless communication therein. Various cellular communication standards are currently in use while other are being developed. The popular ones are: UMTS, HSPA, GSM, CDMA-2000, TD-SCDMA, LTE and WiMAX.

The term "Universal Mobile Telecommunications System" or "UMTS" as used herein in this application, is one of the third-generation (3G) cell phone technologies, which is also being developed into a 4G technology. Currently, the most common form of UMTS uses Wideband Code Division Multiple Access (W-CDMA) as the underlying air interface. W-CDMA is a wideband spread-spectrum mobile air interface that utilizes the direct-sequence spread spectrum method of asynchronous code division multiple access to achieve higher speeds and support more users compared to the implementation of time division multiplexing (TDMA) used by 2G GSM networks.

The term "Macrocell" as used herein in this application, also known as Macrocell Base Station (MBS) is defined as a cell in a mobile phone network that provides radio coverage served by a power cellular base station (e.g. tower). The antennas for macrocells are usually mounted on ground-based masts, rooftops and other existing structures, at a height that provides a clear view over the surrounding buildings and terrain. Macrocell base stations have power outputs of typically few watts to tens of watts.

The term "Femtocell" as used herein in this application, is the industry term for a small cellular communication base station, typically designed for use in residential, enterprise or small business environments. The femtocell connects to the service provider's network via broadband Ethernet connection (such as DSL or cable). Current designs typically support two to five mobile phones simultaneously in a residential setting. A femtocell allows service providers to extend service coverage and capacity indoors, especially where access would otherwise be limited or unavailable. The femtocell incorporates the functionality of a typical base station but extends it to allow a simpler, self contained deployment. By way of example, a UMTS femtocell may contain a Node B, RNC and GSN with Ethernet connection for backhaul.

The terms "Microcell" and "Picocell" as used herein in this application are the industry terms used to describe cells in a mobile phone network served by a low power cellular base station, covering a limited area such as a mall, a hotel, train station or an aircraft. A microcell is usually larger than a picocell, though the distinction is not always clear. Both microcells and picocell use power control to limit the radius of their coverage area. Typically a microcell is approximately a kilometer wide and a picocell covers a few hundred meters.

FIG. 1 shows a high level schematic block diagram of a cellular communication base station incorporating a base band processor according to the prior art. Femtocell base station 10 usually comprises a single digital base band processor 12 that is connected to an RF unit 18, a 10/100 Ethernet physical layer 20, a flash based storage 16, and an SRAM memory 14. RF unit 18 comprises an antenna through which communication between femtocell base station 10 and a plurality of cellular communication enabled devices (hereinafter "user equipment" or "UE") 50A-50C is established. Base band processor 12 connects to mobile operator network 40 via Ethernet physical layer 20 and gateway 30.

In operation, base band processor 12 is arranged to manage the RF communication traffic with plurality of UE 50A-50C and simultaneously manage the Ethernet backhaul with mobile operator network 40. The number of UE as well as other properties of femtocell base station 10 depends on the processing power of base band processor 12.

One of the challenges of the evolving cellular communication base stations technology is to provide cost effective coverage of the cellular communication network given the users traffic requirements and the physical layout constraints. A base station within a cellular network is regarded cost effective in view of the ratio between the number of users supported by it and the cost of the processor(s) that are required to implement it.

Specifically, cost effective deployment of base stations and the ability to provide the most suitable type of base station, be it femtocell, picocell or microcell is much affected by the cost flexibility of each type of base station.

It would be therefore advantageous to provide a solution for cost effective provision of variable performance base stations that differ in coverage area and processing power and yet provide all of the required functionalities of cellular communication networks.

BRIEF SUMMARY

Embodiments of the present invention provide a digital base band processor for a base station in a cellular communication network wherein the processor comprises a communication, control and interface modules providing scalability support functionality enabling the cascade of a plurality of similar processors for implementing base stations with varied coverage areas and processing power.

Accordingly, according to an aspect of the present invention, there is provided a cost effective manner in which base stations with different coverage areas and processing power may be implemented using an array of base band processors of the same type. This is provided in the present invention by adding scalability support functionality to a base band processor and yet maintaining all functionalities required for managing the communication traffic of a cellular communication network.

According to another aspect of the present invention, there is provided a digital base band processor for cellular communication networks comprising: a processing unit; a first layer engine; a communication module, a control module and an interface module, wherein the processing unit and the first layer engine are arranged in cooperation to manage and control user equipment traffic over the cellular communication network, and wherein the a communication module, a control module, and an interface module enable coherent and aligned cooperation between the base band processor and a plurality of similar base band processors connected thereto.

According to still another aspect of the present invention, there is provided an array of base band processors cooperating for sharing processing power in managing and controlling user equipment traffic in a cellular communication base station. The array of base band processors comprises: a master base band processor; and a plurality of slave base band processors, wherein each base band processor comprise a processing unit, a first layer engine, a communication module, a control module, and an interface module, and wherein the processing unit and the first layer engine are arranged in cooperation to manage and control user equipment traffic in the cellular communication base station, and wherein the communication module, control module, and the interface module enable coherent and aligned cooperation between the master base band processor and the plurality of slave base band processors connected thereto.

According to yet another aspect of the present invention there is provided a method of providing scalability support for cellular communication base stations. The method comprises: providing an array of base band processor comprising a master processor and a plurality of slave processors; clocking the slave processors responsive to the master processor; aligning processing parameters between master processor and slave processors; enabling communication between master processor and slave processor for sharing processing power for managing and controlling user equipment covered by the cellular communication base station.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

Figure 1:
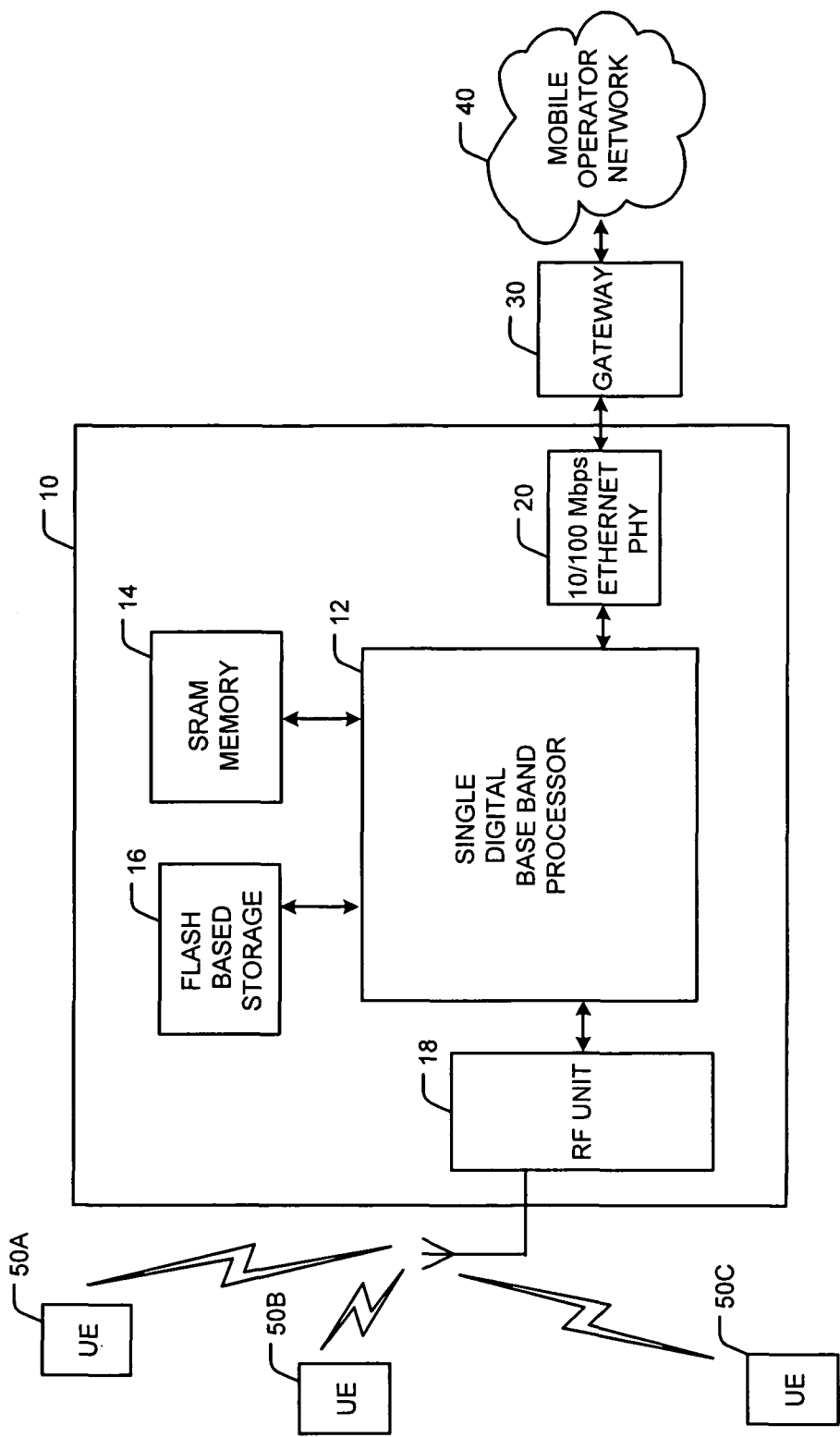
FIG. 1 is a high level schematic block diagram of a cellular communication base station incorporating a base band processor according to the prior art.

The drawings together with the following detailed description make apparent to those skilled in the art how the invention may be embodied in practice.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
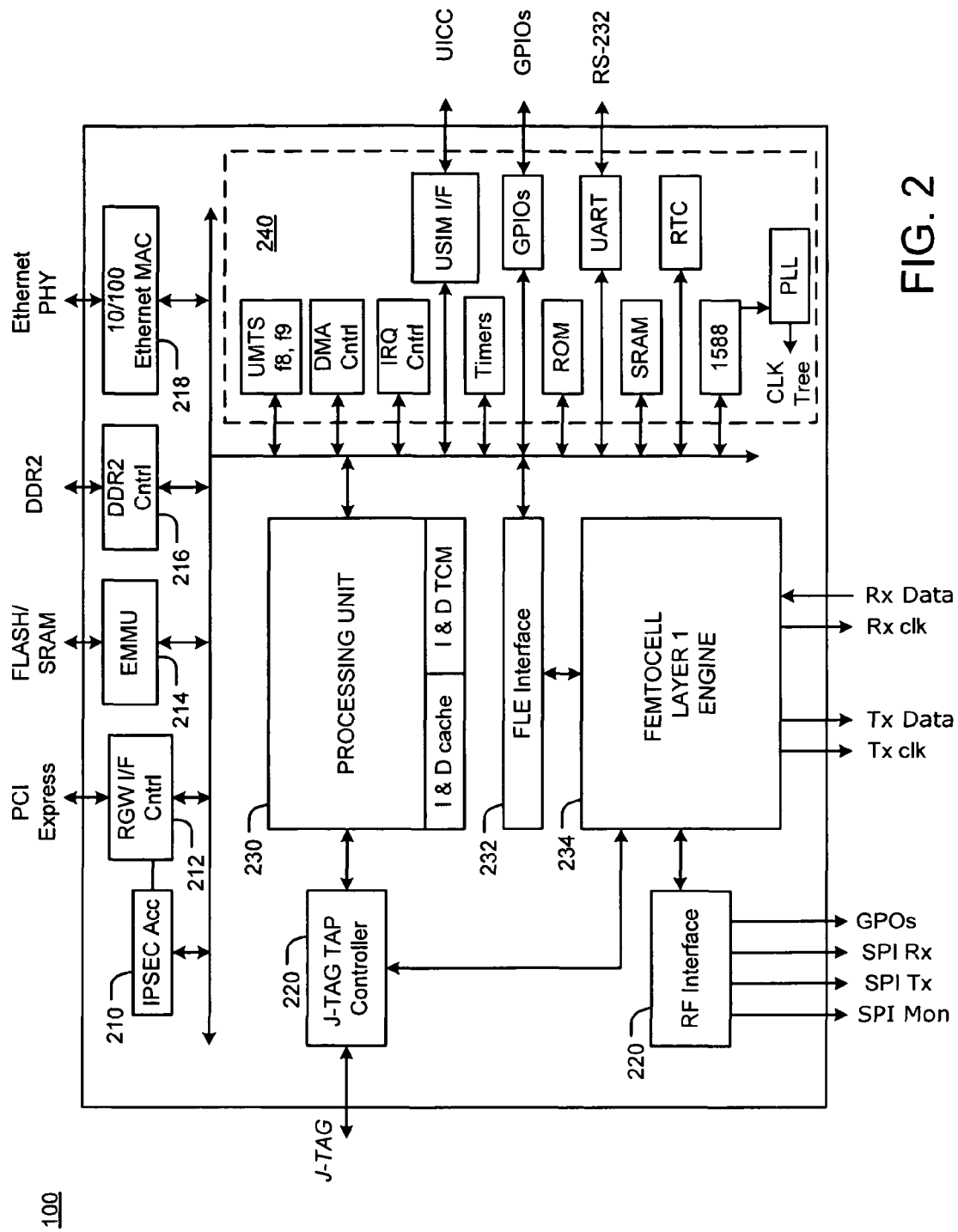
FIG. 2 is a high level schematic block diagram of a digital base band processor according to an embodiment of the present invention.

FIG. 2 shows a high level schematic block diagram of a digital base band processor according to an embodiment of the present invention. Base band processor 100 comprises a processing unit 230 coupled to a communication module 240 via a bus. Communication module 240 is connected to a femtocell layer 1 engine (FLE) interface 232 which in turn is connected to femtocell layer 1 engine (FLE) 234. FLE 234 is connected to RF interface 220. Communication module 240 is further connected via a bus to control and interface modules 210, 212, 214, 216 and 218.

In operation, processing unit 230 is arranged to manage the communication traffic of all UE (not illustrated) within the coverage area of the base station. FLE 234 is arranged to manage the Ethernet backhaul with the mobile network. The introduction of the aforementioned communication modules 240 and interface modules 210, 212, 214, 216 as arranged within processor 100 provides scalability support functionality enabling processor 100 to communicate with similar processors and cooperate therewith to achieve greater processing power such that a greater coverage area with more UE's can be managed by the base station. The architecture and data flow of interconnecting a plurality of base band processors such as processor 100 is explained hereinafter.

According to some embodiments of the present invention, processor 100 may support up to 8 UEs (in a non limiting example only). Processor 100 may operate in high data rates such as HSDPA 21.6 Mbps and HSUPA 5.76 Mbps. Processor 100 may further be arranged to connect to the internet using the embedded Ethernet MAC and generally contains all the relevant peripherals that are needed for UMTS femtocell CPE.

Figure 3:
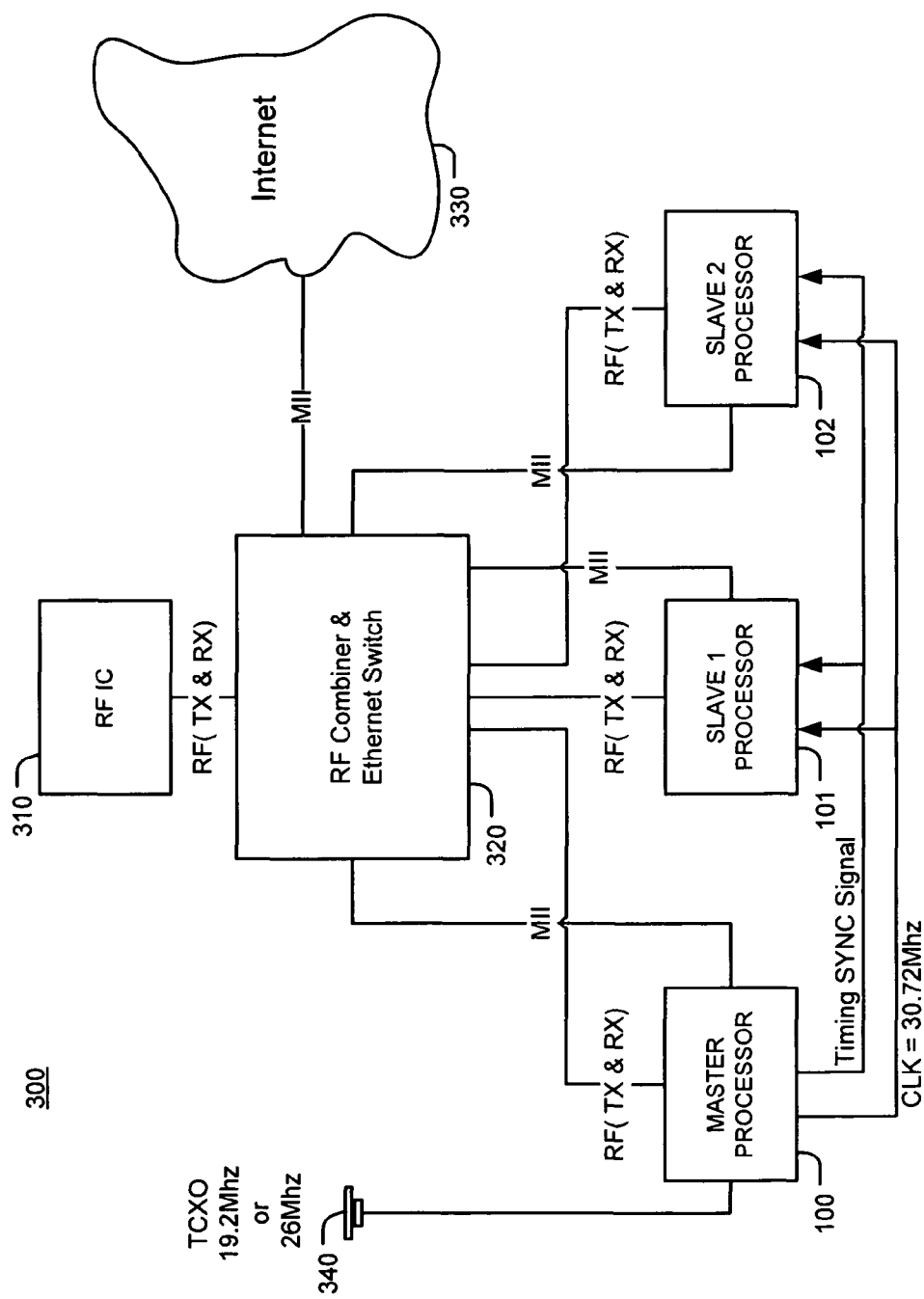
FIG. 3 is a high level schematic block diagram of a cellular communication base station incorporating a plurality of base band processors according to some embodiments of the present invention.

FIG. 3 is a high level schematic block diagram of a cellular communication base station incorporating a plurality of base band processors according to some embodiments of the present invention. Multiple processor base station 300 comprises a plurality of base band processors 100, 101 and 102 that are arranged in a master-slave configuration. Each one of base band processors 100, 101 and 102 comprises scalability support functionality (not shown) as depicted above, with processor 100 configured as a master processor and processors 101 and 102 configured as slave processors.

Multiple processor base station 300 further comprises an RF combiner & Ethernet switch 320 that is connected to an RF unit 310 for communicating received and transmitted UE data. RF combiner & Ethernet switch 320 is further connected to the Internet 330 via a media independent bus (MII). RF combiner & Ethernet switch 320 is further connected to master processor 100 and to slave processors 101 and 102 via an MII bus and RF data communication like exhibiting both transmitted and received UE data. Master processor 100 is connected to slave processors 101 and 102 via a timing Sync connection and via a clock connection. Master processor 100 is further connecter to a local oscillator 340 generating a clock signal, for example, at 19.2 MHz or 26 MHz, but not limited to these frequencies.

In operation, communication module 240, in cooperation with control and interface modules 210, 212, 214, 216 and 218 provide scalability support functionality to base band processors 100, 101 and 102. The scalability support functionality enables managing greater number of UEs. In a non limiting example, given that each of base band processors 100, 101 and 102 can manage up to 8 UEs, the configuration of base station 300 can manage up to 24 UEs.

According to some embodiments of the present invention, master processor 100 provides scalability functionality that enables it to generate a synchronization output signal and deliver the synchronization signal to all slave processors 101 and 102 so that all processors are synchronized. The scalability functionality in master processor 100 further enables master processor 100 to deliver a clock signal to all slave processors 101 and 102 so that all processors are clocked identically.

According to some embodiments of the present invention, master processor 100 a slave processors 101 and 102 provide scalability functionality that further enables them to supporting Ethernet MAC interface for inter-processors communication. This is implemented as a plurality of communication and interface modules (not shown) that are connected via a MII to RF combiner & Ethernet switch 320.

Figure 4:
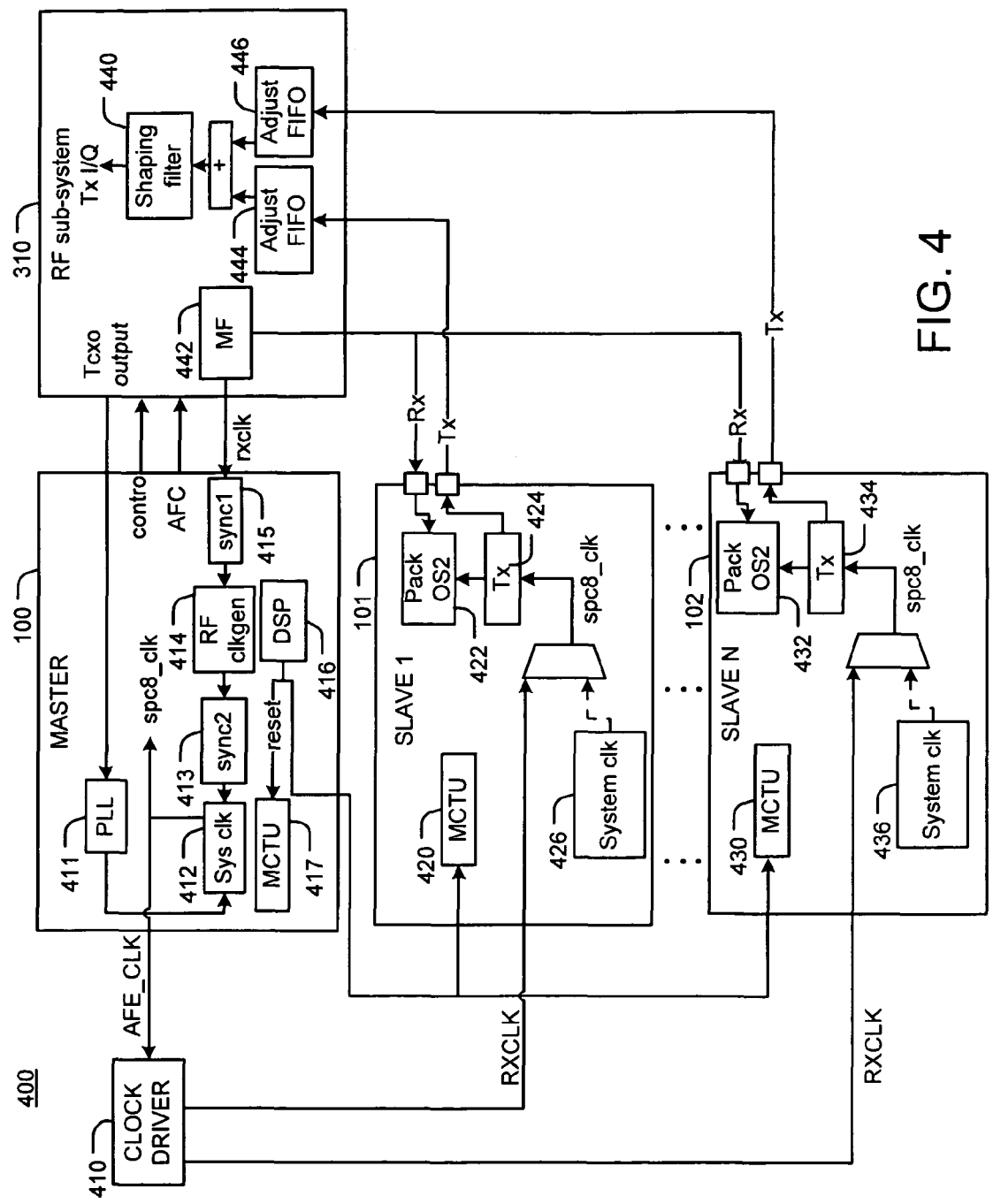
FIG. 4 is a high level schematic block diagram of an array of base band processors according to some embodiments of the invention.

FIG. 4 is a high level schematic block diagram of an array of base band processors 400 (base band integrated circuits—BBICs) according to some embodiments of the invention. As described above, coherent clocking and signal timing is a prerequisite for proper operation of array of processors 400. Master processor 100 comprises a sync 1 unit 415, connected to an RF clock generator 414, connected to a sync 2 unit 413 connected to a local clock 412 which is connected to a PLL 411. Master processor 100 further comprises a DSP 416 connected to a MCTU-W unit 417.

Slave processor 101 comprises a clock unit 426, coupled to a Tx unit 424, connected to a Pack OS2 unit 422, and an MCTU unit 420. Similarly, Slave processor 102 comprises a clock unit 436, coupled to a Tx unit 434, connected to a Pack OS2 unit 432, and an MCTU-W unit 430.

Array of processors 400 further comprises an RF sub system 310 comprising adjust FIFO units 444 and 446 both connected to a shaping filter 440, and an MF unit 442. Master processor 100 is connected to slave processors 101 and 102 via clock driver 410. Further, digital signal processor (DSP) 416 of master processor 100 is connected to master counter 420 and master counter 430 respectively for aligning slave DSPs (not shown) of slave processors 101 and 102.

In operation, system clock signal is generated in master processor 100 in cooperation of PLL 411 and an oscillator (not shown) from RF sub system 310. Clock signal is propagated to slave processors 101 and 102 in order to apply coherent timing via clock driver 410.

In addition, DSP 416 of master processor 100 resets local master counter 417. This reset is spread to all slave processors 101, 102 so all counters are aligned.

In addition, master processor 100 controls RF sub system 310 and assigns settings, clocks, frequency adjustment, and any parameter required for coherent and cooperative operation of the processors within the array.

Figure 5:
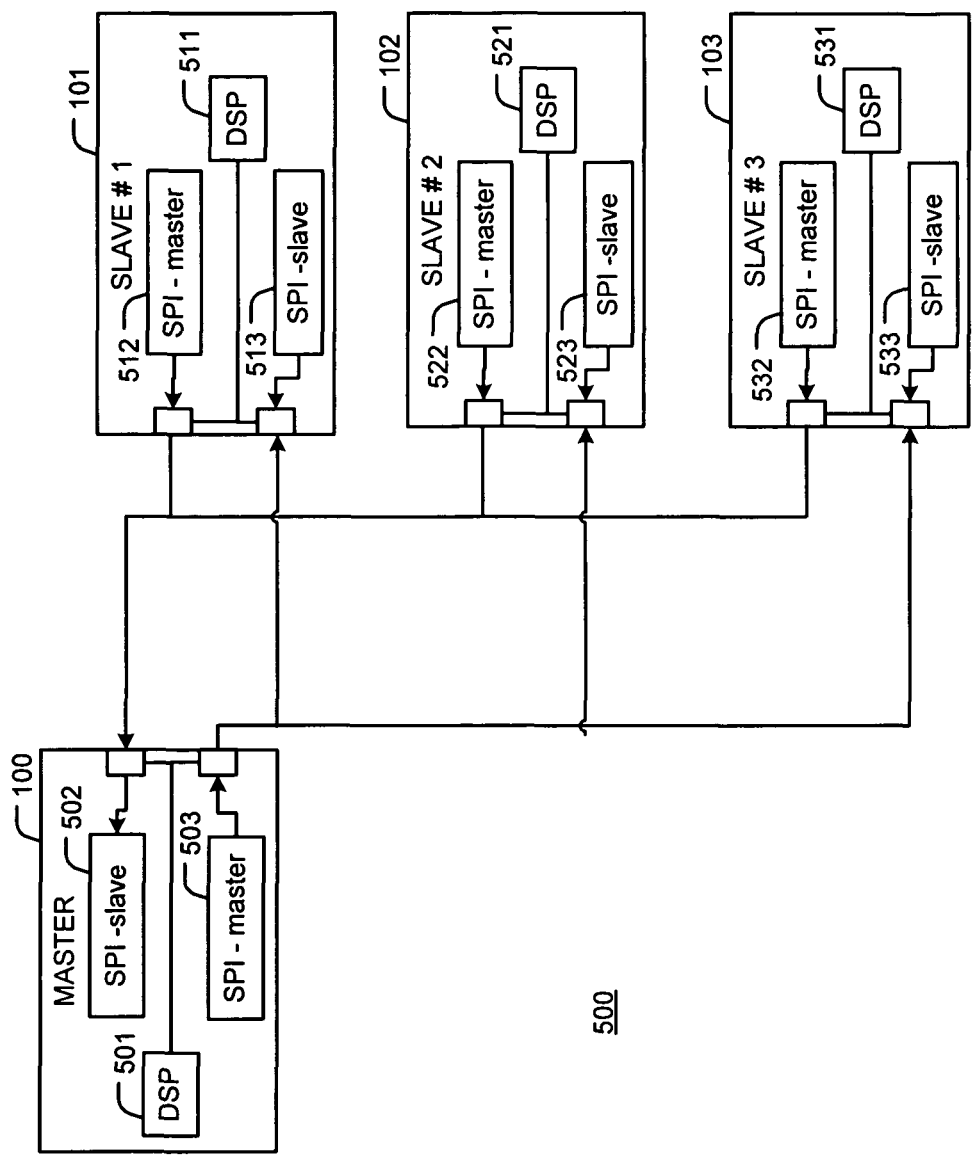
FIG. 5 is a high level schematic block diagram of an array of base band processors according to an embodiment of the present invention.

FIG. 5 is a high level schematic block diagram of an array of base band processors 500 according to an embodiment of the present invention. This diagram shows the DSP communication between master processor 100 and three slave processors 101, 102 and 103. Master processor 100 comprises a DSP 501, a Master high speed serial peripheral interface (SPI) 503 and a slave SPI 502. Similarly, slave processors comprise each a DSP 511, 521 and 531 a master serial peripheral interface (SPI) 512, 522 and 532 and a slave SPI 513, 523 and 533.

In operation, each slave SPI 502, 513, 523 and 533 is arranged to receive data from neighboring processors and each master SPI 503, 512, 522 and 532 is arranged to transmit data to neighboring processors. As explained above, a reset mechanism is operable such that all counters of DSPs are aligned so that the DSPs may cooperate.

According to some embodiments of the invention, array of processors 500 may be arranged to share information pertaining to the operative parameters of the cell in which the base station operates and consequently cooperate in management thereof. Non-limiting examples of such parameters include: the number of user equipment camped (connected) to the base station, and their corresponding level of connectivity (services associated therewith, bandwidth), the configuration of the physical communication links (fingers) and the like.

According to some embodiments of the invention, array of processors 500 may be arranged in cooperation with its processors to perform soft receiver diversity decisions as well as soft transmitter diversity decisions, by aggregating data from several processors and relating to several fingers.

According to some embodiments of the invention, array of processors 500 may be arranged in cooperation with its processors to assign a different coverage range for each processor such that each processor is arranged to manage the traffic in a specific ring within the coverage area of the base station.

Advantageously, array of processors 500 may be arranged in cooperation with its processors to operate modularly and adjust the number of active processors ad hoc, in accordance with the level of activity in the cell—number of UEs, the level of connectivity, physical constraints an the like.

Advantageously, the array processors 500 may be configured in a reduced power consumption configuration by reducing clock rate or shutting down some of the slave processors in view of the actual number of UEs and their corresponding data rates.

Figure 6:
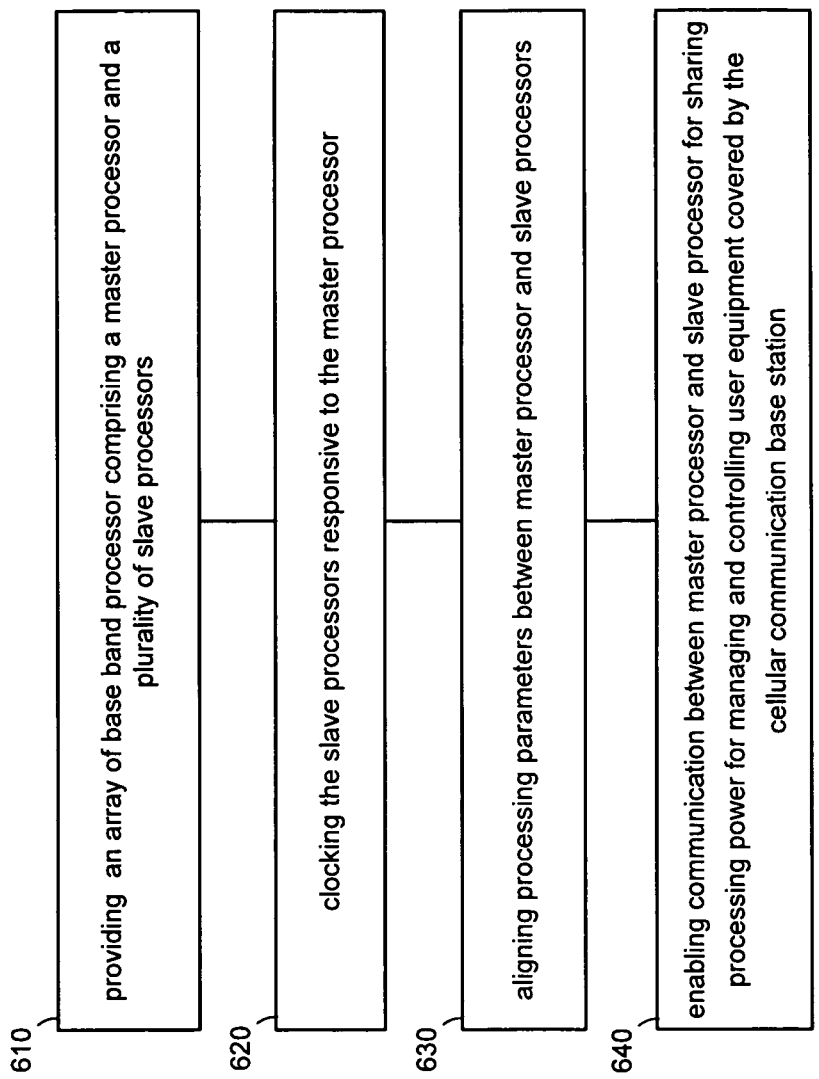
FIG. 6 is a high level flowchart illustrating the method according to some embodiments of the present invention.

FIG. 6 is a high level flowchart illustrating a method according to some embodiments of the present invention. The flowchart depicts a method of providing scalability support for cellular communication base stations. The method comprises: providing an array of base band processor comprising a master processor and a plurality of slave processors 610; clocking the slave processors responsive to the master processor 620; aligning processing parameters between master processor and slave processors 630; and enabling communication between master processor and slave processor for sharing processing power for managing and controlling user equipment covered by the cellular communication base station 640.

Advantageously, the scalability support functionality disclosed hereinabove enables the UMTS NW vendors (or any other cellular communication networks operators) to introduce new femtocells, picocells and even microcells supporting large number of UEs has low price due to the low cost digital base band processor inside.

Advantageously, various embodiments of the present invention are aimed for the UMTS femtocells market. However, it is understood that the necessary modification may be performed in order to support any kind of cellular communication, in any standard. The functionality of the present invention serves as in cooperation with the femtocell base station control unit within that is arranged to perform all femtocell required activities within a standalone femtocell base station.

According to some embodiments of the invention, the system can be implemented in digital electronic circuitry, or in computer hardware, firmware, software, or in combinations thereof. Preferably, the base band processor with the scalability support functionality is implemented as an application specific integrated circuit (ASIC) thus allowing optimization of the performance while keeping cost relatively low.

Suitable processors modules within the ASIC implementation of the base band processors include, by way of example, digital signal processors (DSPs) but also general purpose microprocessors, and field programmable gate array (FPGA). Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage devices suitable for tangibly embodying computer program instructions and data include all forms of non-volatile memory, including by way of example semiconductor memory devices, such as EPROM, EEPROM, and flash memory devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A digital base band processor for use in a cellular communication network, comprising:
    a processing unit;
    a first layer engine;
    a communication module;
    a control module;
    an interface module; and
    a counter configured to be aligned with counters of a plurality of similar digital base band processors,
    wherein the digital base band processor and the plurality of similar digital base band processors are configured to manage user equipment traffic in respective regions from among a plurality of regions within a coverage area of the cellular communication network,
    wherein the processing unit and the first layer engine are configured to, in cooperation, manage and control the user equipment traffic over their respective region from among the plurality of regions within the coverage area of the cellular communication network, and wherein the communication module, the control module, the interface module, and the counter are configured to enable coherent and aligned cooperation between the digital base band processor and the plurality of similar digital base band processors connected thereto.

2. The digital base band processor according to claim 1, further comprising:
additional communication modules configured to enable communication with the plurality of similar digital base band processors.

3. The digital base band processor according to claim 1, further comprising:
a digital signal processor,
wherein the plurality of similar digital base band processors is operatively associated with the digital base band processor for enabling cooperation of the digital signal processor and digital signal processors of the plurality of similar digital base band processors.

4. The digital base band processor according to claim 1, further comprising:
an Ethernet interface module configured to enable the digital base band processor to communicate with the plurality of similar digital base band processors and an Ethernet switch over a media independent interface bus.

5. The digital base band processor according to claim 1, further comprising:
a local clock operatively associated with local clocks of the plurality of similar digital base band processors that are operatively associated with the digital base band processor for aligning timing.

6. The digital base band processor according to claim 1, further comprising:
a master serial peripheral interface configured to share data between the digital base band processor and a slave base band processor from among the plurality of similar digital base band processors; and
a slave serial peripheral interface configured to receive data from the slave base band processor.

7. The digital base band processor according to claim 1, wherein the digital base band processor is a master processor, the master processor comprising:
a phase locked loop configured to generate a clock signal responsive to an external oscillator.

8. The digital base band processor according to claim 1, wherein the digital base band processor is a slave processor, the slave processor comprising:
a local clock configured to track a clock signal of a master processor.

9. A cellular communication base station configured to manage and control communication traffic within a coverage area, comprising:
a digital base band processor from among a plurality of digital base band processors configured to manage and control the communication traffic corresponding to at least one user equipment from among a plurality of user equipment within the coverage area, each of the plurality of digital base band processors being similar digital base band processors,
wherein the digital base band processor is further configured to provide a synchronization signal to at least two remaining digital base band processors from among the plurality of digital base band processors to synchronize the plurality of digital base band processors to enable coherent and aligned cooperation between the plurality of digital base band processors, and wherein each digital base band processor from among the plurality of digital base band processors is configured to manage the communication traffic in a respective region from among a plurality of regions within the coverage area.

10. The cellular communication base station of claim 9, further comprising:
a radio frequency combiner configured to communicate the communication traffic between the plurality of user equipment and the plurality of digital base band processors.

11. The cellular communication base station of claim 10, wherein the radio frequency combiner is configured to communicate the communication traffic between a first user equipment from among the plurality of user equipment and a corresponding first digital base band processor from among the plurality of digital base band processors and to communicate the communication traffic between a second user equipment from among the plurality of user equipment and a corresponding second digital base band processor from among the plurality of digital base band processors, the first and second digital base band processors being configured to manage and control the first and the second user equipment, respectively.

12. The cellular communication base station of claim 9, wherein the synchronization signal is a reset signal.

13. The cellular communication base station of claim 12, wherein each of the plurality of digital base band processors comprises:
a counter configured to be reset by the reset signal.

14. The cellular communication base station of claim 9, further comprising;
a digital signal processor configured to provide the synchronization signal.

15. The cellular communication base station of claim 9, wherein the digital base band processor is further configured to provide a clock signal to the at least two remaining digital base band processors to apply coherent timing to the plurality of digital base band processors.

16. The cellular communication base station of claim 15, further comprising:
a phase locked loop configured to generate the clock signal responsive to an external oscillator.

17. A digital base band processor, comprising:
a processing unit configured to manage and control communication traffic of at least one user equipment from among a plurality of user equipment within a respective region from among a plurality of regions of a coverage area of a cellular communication base station, the processing unit being configured to be communicatively coupled to a plurality of similar digital base band processors, the processing unit and each similar digital base band processor from among the plurality of similar digital base band processors being configured to manage the communication traffic in respective regions from among the plurality of regions within the coverage area; and
a counter configured to be aligned with counters of the plurality of similar digital base band processors,
wherein the processing unit is further configured to provide a synchronization signal to the plurality of similar digital base band processors to align the counter with the counters of the plurality of similar digital base band processors to enable coherent and aligned cooperation between the digital base band processor and the plurality of similar digital base band processors.

18. The digital base band processor of claim 17, wherein the plurality of similar digital base band processors is configured to manage and control the communication traffic of remaining user equipment from among the plurality of user equipment within the coverage area of the cellular communication base station.

19. The digital base band processor of claim 17, wherein the synchronization signal is a reset signal, and wherein each of the plurality of digital base band processors comprises:
   a counter configured to be reset by the reset signal.

20. The digital base band processor of claim 17, further comprising:
   a radio frequency combiner configured to communicate the communication traffic between the plurality of user equipment, the processing unit, and the plurality of similar digital base band processors.

21. The digital base band processor of claim 17, further comprising:
   a digital signal processor operatively associated with the plurality of similar digital base band processors for enabling cooperation of the digital signal processor and digital signal processors of the plurality of similar digital base band processors.

\* \* \* \* \*